United States Patent
Philbin

(10) Patent No.: US 9,054,781 B2
(45) Date of Patent: Jun. 9, 2015

(54) LAND MOBILE RADIO AND ADAPTER FOR USE WITH STANDARD MOBILE PHONE HEADSET

(75) Inventor: Thomas Philbin, Pittsford, NY (US)

(73) Assignee: Harris Corporation, Melbourne, FL (US)

( * ) Notice: Subject to any disclaimer, the term of this patent is extended or adjusted under 35 U.S.C. 154(b) by 976 days.

(21) Appl. No.: 13/032,853

(22) Filed: Feb. 23, 2011

(65) Prior Publication Data

US 2012/0214549 A1 Aug. 23, 2012

(51) Int. Cl.
*H04B 1/44* (2006.01)

(52) U.S. Cl.
CPC .................................. *H04B 1/44* (2013.01)

(58) Field of Classification Search
CPC ............... H04M 2215/2093; H04M 1/6058; H04M 1/00
USPC .......................... 455/519, 41.2, 518; 345/163; 340/539.11
See application file for complete search history.

(56) References Cited

U.S. PATENT DOCUMENTS

| | | | |
|---|---|---|---|
| 5,548,810 A | 8/1996 | Riddell et al. | |
| 5,631,669 A * | 5/1997 | Stobbs et al. | 345/163 |
| 7,623,667 B2 * | 11/2009 | Sander et al. | 381/74 |
| 2005/0064915 A1 * | 3/2005 | Lair | 455/569.1 |
| 2008/0085679 A1 * | 4/2008 | Fettig et al. | 455/41.2 |
| 2008/0102871 A1 * | 5/2008 | Watt et al. | 455/518 |
| 2008/0125042 A1 * | 5/2008 | Kim | 455/41.2 |
| 2009/0029743 A9 * | 1/2009 | Lair et al. | 455/569.1 |
| 2009/0081943 A1 * | 3/2009 | Dobyns et al. | 455/1 |
| 2009/0130910 A1 * | 5/2009 | Inha et al. | 439/638 |
| 2010/0105331 A1 * | 4/2010 | Buehler et al. | 455/41.3 |
| 2011/0034126 A1 * | 2/2011 | Higgins et al. | 455/41.2 |
| 2011/0269412 A1 * | 11/2011 | Bergeron et al. | 455/78 |

* cited by examiner

*Primary Examiner* — Kashif Siddiqui
*Assistant Examiner* — Farideh Madani
(74) *Attorney, Agent, or Firm* — Robert Sacco, Esq.; Fox Rothschild LLP

(57) ABSTRACT

An adapter (400) for a portable land mobile radio (LMR) transceiver system (414) where the LMR includes a push-to-talk (PTT) transmitter control system. The adapter includes a tip-ring-sleeve (TRS) type interface connector (402) configured to accept a plug (101) from a standard mobile phone headset. An adapter circuit (401) is configured to detect a momentary actuation of an answer/end switch (201) of a standard mobile phone headset when a TRS plug of the standard mobile phone headset is inserted in the interface connector (402). The adapter circuit alternately latches a PTT input of the LMR transmitter control system in either a transmit active state, or a transmit inactive state, in response to actuation of the answer/end switch of the mobile phone handset.

16 Claims, 3 Drawing Sheets

LAND MOBILE RADIO AND ADAPTER FOR USE WITH STANDARD MOBILE PHONE HEADSET

BACKGROUND OF THE INVENTION

1. Statement of the Technical Field

The invention concerns land mobile radio equipment. More particularly, the invention concerns ancillary methods and systems for providing hands-free communication using land mobile radio equipment.

2. Description of the Related Art

The baseline configuration for public safety vehicular radios is to supply custom push-to-talk microphone and external speaker accessories in support of voice communications. This configuration has several disadvantages with regard to radio equipment users. For example, with such conventional systems, transmit operation require continuous use of one hand to depress the microphone PTT switch. This can cause operator distraction while driving a vehicle. Also, such conventional microphone systems are relatively bulky and expensive. Moreover, receive operation requires the installation and wiring of a speaker into the vehicle cabin. This can be a costly, intrusive and time consuming process.

Many public safety and emergency vehicles in use today have internal automobile stereo-speaker systems. Using these sounds systems, when available, would be preferred over installing a dedicated radio speaker. However, such an approach would require disassembly of the vehicle to access the speaker circuitry, and a suitable switching circuit to prevent interference with the automobile stereo system.

SUMMARY OF THE INVENTION

The invention concerns a portable land mobile radio (LMR) transceiver system. The LMR transceiver system includes a transmitter control system configured to cause a transmitter of the LMR transceiver system to temporarily transmit an RF signal for a duration of a user activation of a PTT switch. The transceiver system also includes an adapter having a interface connector or socket configured to accept an interface connector from a standard mobile phone headset. The interface connector can be a plug, such as a tip-ring-sleeve (TRS) plug, which includes a tip, a ring, and a sleeve. The answer/end switch selectively forms an electrical connection between the tip and the sleeve when the answer/end switch is activated. The adapter also includes an adapter circuit configured to detect a momentary actuation of an answer/end switch of the standard mobile phone headset while the plug is inserted in the socket. The adapter circuit is configured to alternately latch a PTT input of the transmitter control system in a transmit active state or a transmit inactive state, in response to detecting the momentary actuation of the answer/end switch. The adapter circuit is also designed to couple audio from the interface connector or socket, as provided by a microphone in the mobile phone handset, to the LMR portable transceiver system when the answer/end switch is not activated.

In some embodiments, the adapter circuit includes a memory latch having an output coupled to the PTT input of the transmitter control system. In such embodiments, the adapter circuit can be configured to alternate an output of the memory latch between a transmit active state and a transmit inactive state in response to each momentary actuation of the answer/end switch. The transmitter control system is configured to cause the transmitter to transmit when the memory latch has the transmit active state, and to stop transmitting when the memory latch has the transmit inactive state. The adapter circuit can also be configured to automatically reset the memory latch to the transmit inactive state under predetermined conditions, in the absence of detecting actuation of the answer/end switch.

The adapter circuit advantageously includes a headpiece audio interface configured to couple audio, including alert tones, from the LMR transceiver system, to the socket, for reproduction in an earpiece of the mobile phone headset. The headpiece audio interface adjusts a receiver audio output level of the LMR transceiver to make it compatible with an impedance of the earpiece. In addition, a microphone audio interface amplifies and provides level adjustment of the audio from the headset microphone.

BRIEF DESCRIPTION OF THE DRAWINGS

Embodiments will be described with reference to the following drawing figures, in which like numerals represent like items throughout the figures, and in which.

DETAILED DESCRIPTION

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The invention concerns a land mobile radio (LMR) adapter which accepts a standard plug associated with a mobile phone headset, and which converts the 'answer/end' function of such headset into a push-to-talk (PTT) event to indicate a transmit request from the operator. The adapter routes audio signals to and from the headset and LMR at power levels compatible with the headset earpiece and microphone, and with the LMR audio interface. In some embodiments, the adapter is compatible with a standard 2.5 mm three wire tip-ring-sleeve (TRS) plug which is commonly used for mobile phone headsets. The adapter is configured to use signals from such a standard mobile phone headset to generate a push-to-talk signal for an LMR. The adapter can also include an interface to connect the LMR audio output to an MP3 audio input adapters as is commonly provided for car audio systems. In order to facilitate communicating such audio signals to an MP3 audio input provided in the vehicle, the adapter can include a socket designed to receive a standard 3.5 mm TRS plug, as is commonly used for MP3 audio. Such an arrangement enables the user to route level adjusted received audio from the LMR directly to the MP3 input of the vehicle's factory audio system.

Figure 1:
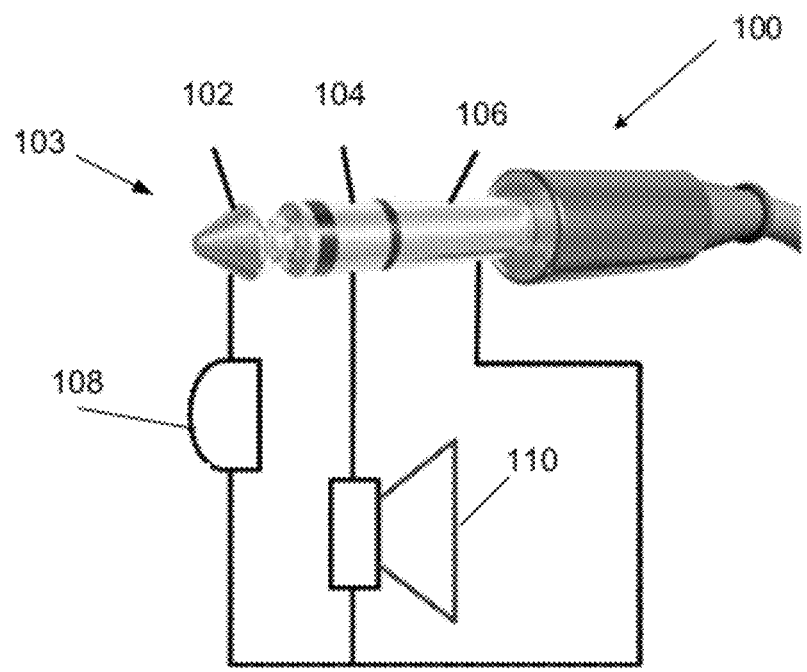
FIG. 1 is a conceptual diagram that is useful for understanding the standard electrical connections associated with a 2.5 mm TRS plug when used for a mobile telephone headset.

Referring now to FIG. 1, there is provided a conceptual drawing which shows a TRS plug 103 and the electrical connections typically associated with such plug in a mobile phone headset 100. As illustrated in FIG. 1, the tip terminal 102 is connected to a microphone 108, and ring terminal 104 is connected to an earpiece 110. The microphone 108 and earpiece 110 are also connected to sleeve terminal 106.

Based on FIG. 1, it will be appreciated that a standard 2.5 mm TRS plug of a mobile phone headset provides for a microphone input and an earpiece output to connect audio from the mobile phone to the user. An additional function found in many of these headsets is an 'answer/end' switch, usually located in the middle of the wiring assembly that connects the earpiece and the TRS connector.

Figure 2:
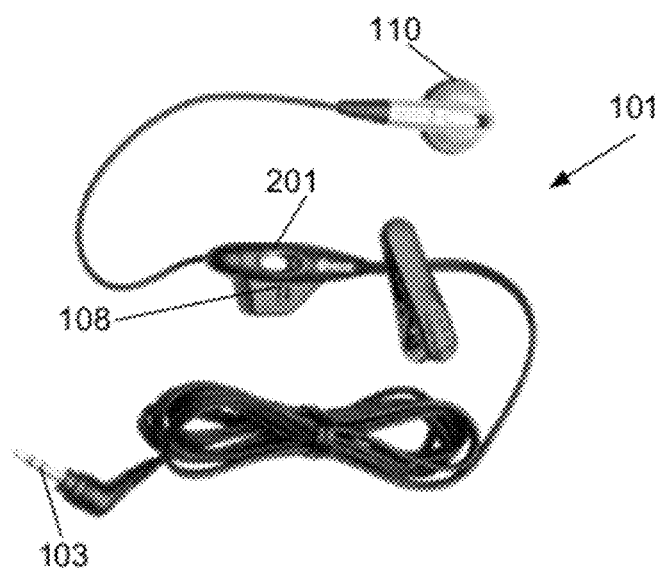
FIG. 2 is an example of a mobile telephone headset.
Figure 3:
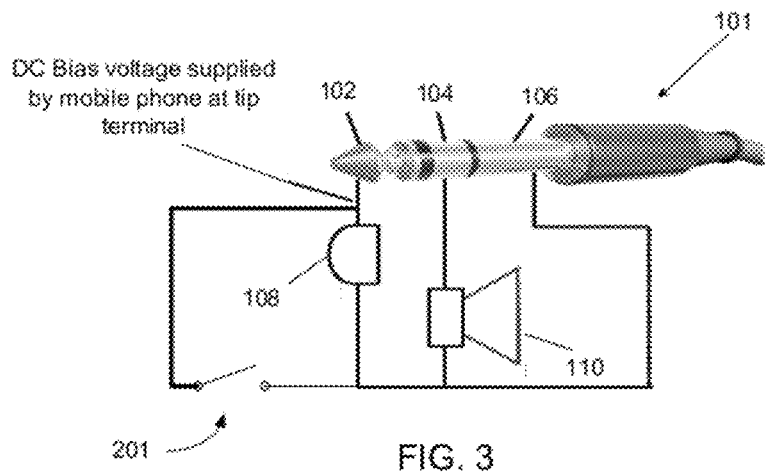
FIG. 3 is a conceptual diagram that is useful for understanding the standard electrical connections associated with a 2.5 mm TRS plug when used for a mobile telephone headset which has an answer/end switch.

A mobile phone headset 101 with an answer/end switch 201 is shown in FIGS. 2 and 3. As with the headset in FIG. 1, the tip terminal 102 is connected to a microphone 108, and ring terminal 104 is connected to an earpiece 110. The microphone 108 and earpiece 110 are also connected to sleeve terminal 106. The answer/end switch 201 is connected between the sleeve terminal 106 and the tip terminal 102. The mobile phone headset 101 shall sometimes be referred to herein as a standard mobile phone headset.

In a standard mobile phone headset 101, the function of the answer/end switch 201 is to allow the user to answer an incoming call on a mobile phone remotely without having to reach for the keypad, open the clamshell or manipulate some other control on the phone itself. The user answers a call by momentarily pushing the answer/end switch 201. When a call is completed, the user can end the call by pushing the answer/end switch again to terminate the call session. This 'toggle' function of the switch allows the user to safely start and end a receive message session on a mobile phone. Alert tones and context allow the user to naturally maintain knowledge of when the switch is being used to answer a call and when it is used to end a call.

The answer/end switch 201 on a standard mobile phone headset 101 provides the signal to 'answer' or 'end' a call by changing the DC voltage bias on the tip terminal 102 of the TRS plug 101. A mobile phone will normally provide a bias voltage to the standard mobile phone headset 101 on the microphone input, as shown in FIG. 3. It can be observed that one side of answer/end switch 201 is connected to the tip terminal 102 and the other side is connected to the sleeve terminal 106, which acts as the reference voltage, or electrical 'ground' for the system. When the switch 201 is closed, the tip terminal 102 and sleeve terminal 106 are shorted together, such that the microphone's DC bias is momentarily "grounded." A sense circuit in the mobile phone (not shown) can detect the change in voltage, and generates an 'answer/end' active signal. After the switch is released, the microphone 108 can conduct the user's audio input to the phone on the tip terminal 102. From the foregoing, it will be appreciated that the tip terminal 102 basically has two functions: accepting speech input from the user (an AC signal) and relaying the activation of the answer/end switch (a DC signal). These inputs are used at different times of operation so the momentary shorting of the microphone input does not interfere with the speech input.

A conventional two-way radio such as an LMR requires a push-to-talk input for a user to indicate that they want to broadcast (transmit) a message. Typically, a PTT switch is a mechanical switch that is located on a radio's microphone or handset. The mechanical switch is continuously depressed during the transmit session when the user is speaking. When the mechanical switch is depressed (PTT active), control circuitry causes a transmitter in the LMR to transmit. When the PTT is released (PTT inactive), the radio stops transmitting and switches back to receive mode. This is how classic two-way radio systems arbitrate message sessions.

Figure 4:
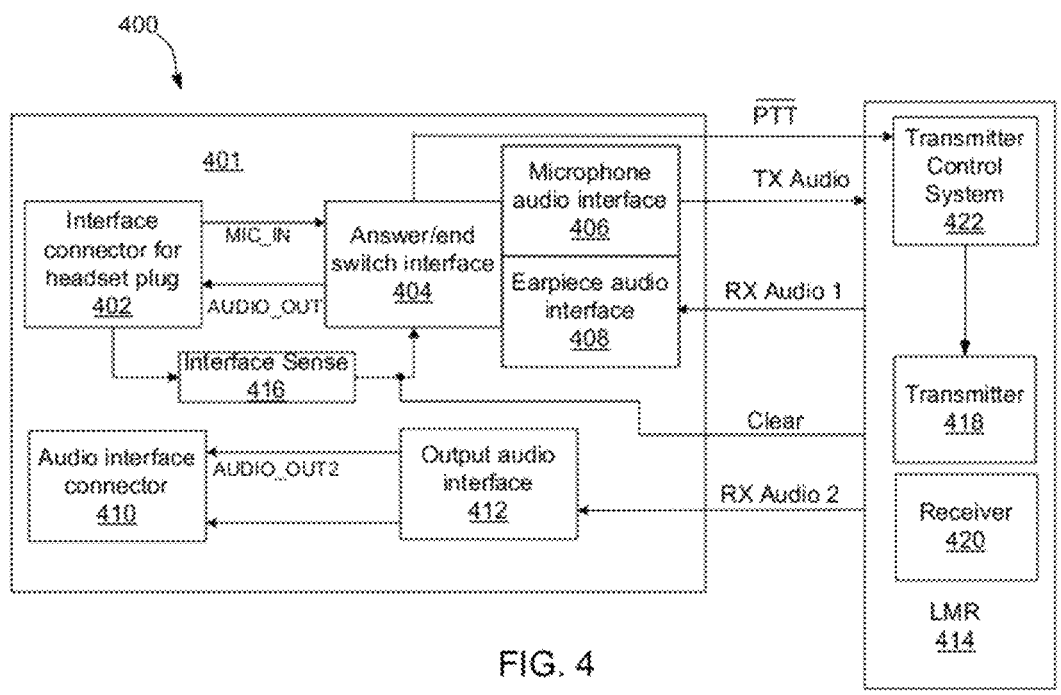
FIG. 4 is a block diagram that is useful for understanding an adapter which facilitates use of a conventional mobile telephone headset with a land mobile radio using a push-to-talk transmitter control system.
Figure 5:
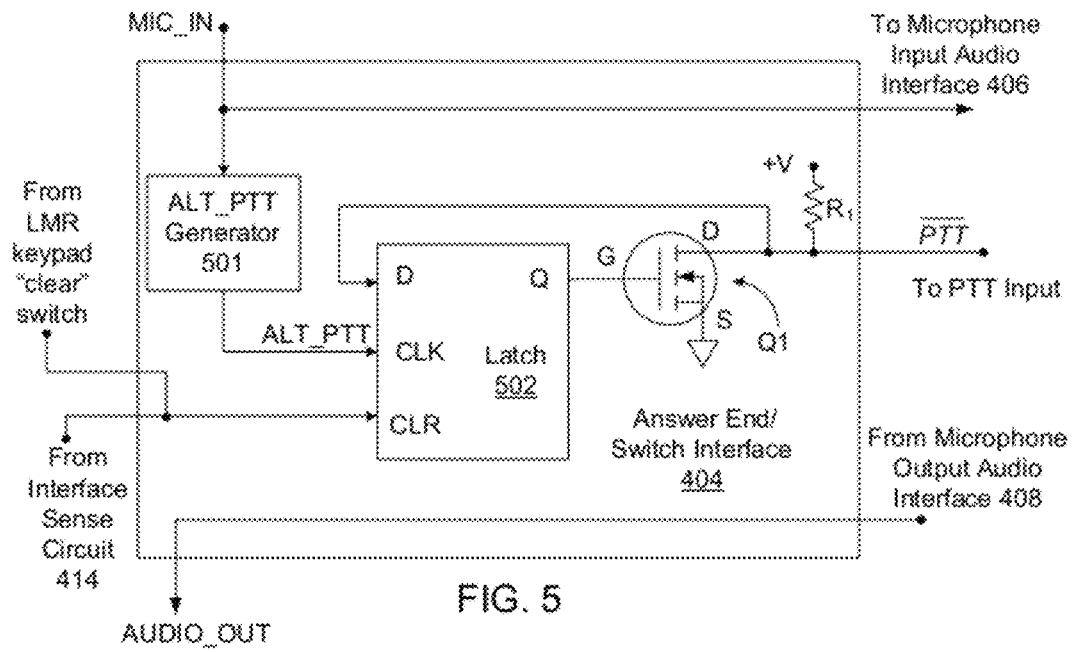
FIG. 5 is a more detailed diagram showing an answer/end switch interface.
Figure 6:
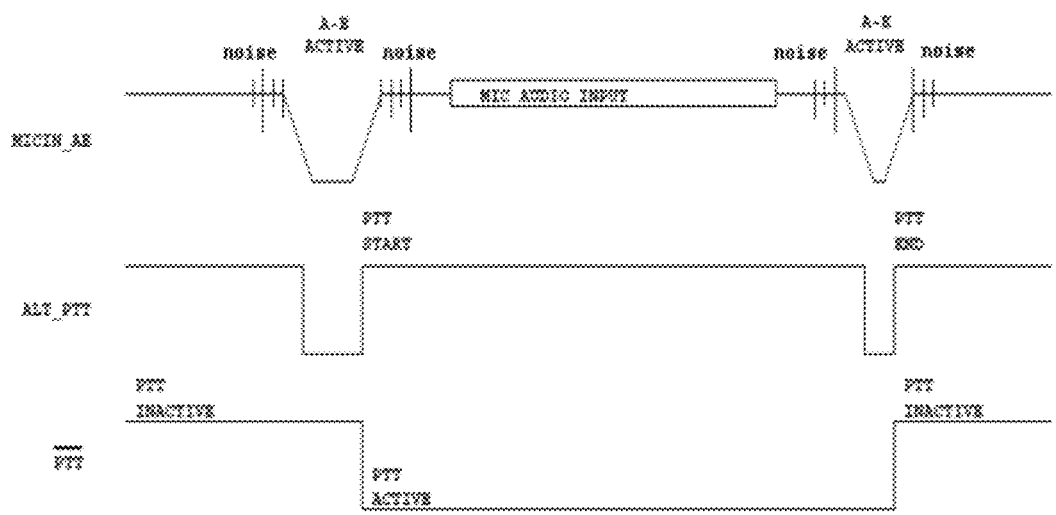
FIG. 6 is a signal timing diagram which shows the interaction of various signals associated with a mobile telephone headset and the adapter in FIG. 4.

Referring now to FIGS. 4-6, an LMR adapter 400 uses the answer/end switch function of a standard mobile phone headset 101 to arbitrate a transmit message session in an LMR transceiver 414. The LMR transceiver 414 includes a receiver 420, a transmitter 418, and a transmitter control system 422. The transmitter control system is configured to cause a transmitter of the LMR transceiver system to temporarily transmit an RF signal for a duration of a user activation of a PTT switch. The structure and operation of a transmitter control system as referenced herein shall not be described here in detail since such control systems are well known in the art. Generally, however, the transmitter control system 422 can be any system configured to cause the LMR 414 to function in accordance with the classic two-way radio system methods described above. When the transmitter control system 422 detects a signal produced by closure of a PTT switch (PTT active), the transmitter control system 422 causes a transmitter in the LMR 414 to transmit. When the control system detects a signal (or absence of a signal) which indicates that the PTT is released (PTT inactive), the LMR transceiver stops transmitting and switches back to receive mode. The control signal used by the transmitter control system 422 is referred to herein as $\overline{PTT}$.

The adapter 400 supports a standard interface used with standard mobile phone headsets. For example, the standard interface connector 402 is advantageously selected to include a 2.5 mm TRS headset plug and uses the answer/end input signal generated by the answer/end switch 201 to toggle the state of the push-to-talk input of the LMR. When the user momentarily depresses the answer/end switch 201, the adapter 400 will alternately generate a PTT active or inactive signal to the LMR 414. In other words, a first momentary push of the answer/end switch 201 will cause the adapter 400 to generate a PTT active signal to the LMR 414. The PTT active signal results in a transmit session for the LMR 414. A second momentary push of the answer/end switch 201 will cause the adapter 400 to generate a PTT inactive signal to the LMR 414. The PTT inactive signal terminates the transmit session and begins a receive session. This arrangement can be contrasted to the PTT signaling methods of classic two-way radio systems in which a PTT switch must be remain closed to produce a PTT active signal for a duration of a transmission. Thus, the adapter 400 provides a way for a standard mobile phone headset 101, which is not configured to provide PTT functionality, to nevertheless be used with a transmitter control system 422 that operates in accordance with a classic two-way radio control method. The state of the PTT input, and transmit state of the LMR 414, can be determined by alert tones and context the same way the user is aware of the receive message state of a mobile phone when using the standard mobile phone headset.

As illustrated in FIG. 4, the adapter 400 can include several functional blocks comprising an adapter circuit 401. These functional blocks include an answer/end switch interface 404, a microphone input audio interface 406, and a microphone output audio interface 408. Referring now to FIG. 5, the answer/end switch interface 404 includes an ALT_PTT generator circuit 501 which monitors the signals received from the microphone tip terminal 102 to detect momentary activation of the answer/end switch 201. The ALT_PTT generator circuit filters noise and audio inputs on the tip terminal and provides hysteresis protection with respect to the answer/end events produced by answer/end switch 201.

The monitored signal from the microphone tip terminal 102 is identified in FIG. 6 as MICIN_AE. The MICIN_AE signal will generally include noise, and time-varying microphone audio signals as shown. Upon detecting activation of the answer/end switch 201 (A-E active), the ALT_PTT generator will generate an output pulse as shown in FIG. 6. The ALT_PTT signal is coupled to the clock input of a latch 502. Consequently, on a positive transition (PTT Start) of the ALT_PTT signal, the output of latch 502 will toggle from a first output state to a second output state as shown. The next positive transition (PTT End) will cause the latch 502 to toggle from the second output state, back to the first output state. Referring once again to FIG. 5 it can be observed that an output transistor drive component Q1 is advantageously provided for driving a PTT input of an LMR. In some embodiments, Q1 can be an FET type transistor with a gate (G), drain (D) and source (S). The drain D of Q1 is coupled to a voltage +V through resistor R1. Accordingly, when an output Q of latch 502 is "high", current will be allowed to flow between the drain and source terminals, thereby causing the output of Q1 at D to be "low." The output of Q1 is identified as $\overline{PTT}$.

Referring once again to FIG. 6, it can be observed that the $\overline{PTT}$ signal in the timing diagram begins as a PTT Inactive output (LMR does not transmit), and then transitions to PTT Active output (LMR will transmit) after the occurrence of the PTT Start signal from the ALT_PTT generator 501. The $\overline{PTT}$ signal returns to PTT Inactive after the occurrence of the PTT End signal from the ALT_PTT generator. Those skilled in the art will appreciate that the particular circuit arrangement described with respect to FIGS. 5 and 6 is one possible embodiment of an adapter, but that the invention is not intended to be limited to such an embodiment.

According to an embodiment of the invention, the LMR adapter 400 has safeguards added to force the adapter to generate a receive state output under certain conditions. For example, a normal use case where this would be desirable is when the user initiated a transmit session and then unplugged the TRS connector from the interface connector 402 that is provided on the adapter. The adapter advantageously includes the ability to force the adapter back to a receive (PTT inactive) state automatically. The circuitry for performing this action could be implemented in a variety of different ways. For example, FIG. 4 shows that an interface sense circuit 416 can be provided to detect when a TRS plug is removed from the TRS socket. The interface sense circuit 416 can include suitable logic circuitry to generate a "reset" control signal when the TRS plug is removed from the interface connector 402 and the adapter output is in a PTT Active state. As shown in FIGS. 4 and 5, the control signal is coupled to the clear input (CLR) of latch 502 for purposes of returning the $\overline{PTT}$ signal to the PTT Inactive state (see FIG. 6). Similarly, a keypad reset or clear switch (not shown) provided on the LMR can be used to manually generate a reset control signal to the clear (CLR) input of the latch 502. In some embodiments of the invention, the functionality of interface sense circuit 416 can be at least partially implemented by a controller or microprocessor circuit associated with the adapter or LMR. Still, the invention is not limited in this regard and any suitable circuit can be provided for this purpose without limitation.

Referring once again to FIG. 4, The LMR adapter may provide amplification and level adjustment of the microphone audio signal to make it optimal for the radio's transmit audio input interface. Those skilled in the art will appreciate that microphone levels associated with inexpensive mobile phone handsets are not generally compatible with LMR audio input interfaces. Accordingly, the microphone input audio interface 406 provides audio amplification and suitable level adjustment to modify audio generated by microphone 108 so that it is compatible with the LMR 414. Similarly, the LMR adapter 400 advantageously includes a earpiece audio interface 408 which adjusts the output level of the LMR receive audio to make it compatible with the impedance of the earpiece 110 of the standard mobile phone headset 101.

The LMR adapter 400 can also provide a convenient means for allowing LMR audio output to be coupled directly to a factory installed audio system of a vehicle. This connection can be established by taking advantage of an existing MP3 player audio interface socket provided on many vehicles as original equipment. Such MP3 player audio interfaces commonly make use of a standard 3.5 mm TRS plug/socket arrangement for establishing audio connections. An output audio interface 412 accepts receiver audio from LMR 414 and adjusts the output power level to make it compatible with a standard MP3 player audio input provided in a vehicle. With such an arrangement, there is no longer a need for a dedicated speaker for LMR audio. Instead, the LMR audio can be played directly through the factory sound system provided with the vehicle. This is a great advantage for users of LMR devices because it eliminates the cost installing dedicated loudspeaker systems, and the cost of the dedicated LMR loudspeaker.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. A portable land mobile radio (LMR) transceiver system, comprising:
   a transmitter control system configured to cause a transmitter of said LMR transceiver system to temporarily transmit a Radio Frequency (RF) signal for a duration of a user activation of a push-to-talk (PTT) switch;
   an adapter coupled to said transmitter control system to facilitate operation of said transmitter control system with a standard mobile phone headset that does not include the PTT switch, said adapter comprising:
      an interface connector or socket configured to accept a plug from the standard mobile phone headset;
      an adapter circuit configured to
         detect when a momentary actuation of an answer/end switch of said standard mobile phone headset is occurring,
         alternately latch a PTT input of said transmitter control system in a transmit active or transmit inactive state in response to said detection that the momentary actuation of the answer/end switch is occurring, detect when the plug of the standard mobile phone headset is being removed from the socket, and latch the PTT input of said transmitter control system from said transmit active state to said transmit inactive state in response to said detection that the plug is being removed from the socket.

2. The portable LMR transceiver system according to claim 1, wherein said adapter circuit further comprises a memory latch having an output coupled to said PTT input of said transmitter control system, and said adapter circuit is configured to alternate an output of said memory latch between said transmit active state and said transmit inactive state in response to each momentary actuation of said answer/end switch.

3. The portable LMR transceiver system according to claim 2, wherein said transmitter control system is configured to cause said transmitter to transmit when said memory latch has said transmit active state, and to stop transmitting when said memory latch has said transmit inactive state.

4. The portable LMR transceiver system according to claim 2, wherein said adapter circuit is configured to automatically reset said memory latch to said transmit inactive state under predetermined conditions.

5. The portable LMR transceiver system according to claim 1, wherein said adapter circuit is configured to couple audio from said LMR transceiver system to said socket for reproduction in an earpiece of said standard mobile phone headset.

6. The portable LMR transceiver system according to claim 1, wherein said adapter circuit is configured to adjust a receiver audio output level of said LMR transceiver to make it operable with an earpiece of the standard mobile phone headset.

7. The portable LMR transceiver system according to claim 1, wherein said adapter circuit is configured to couple audio from a microphone in said mobile phone handset through said socket to said LMR portable transceiver system when said answer/end switch is not activated.

8. The portable LMR transceiver system according to claim 7, wherein said adapter circuit is further configured to provide amplification and level adjustment of said audio from said microphone.

9. The portable LMR transceiver system according to claim 1, wherein said plug is a tip-ring-sleeve (TRS) plug including a tip, a ring, and a sleeve, and said answer/end switch selectively forms an electrical connection between said tip and said sleeve when said answer/end switch is activated.

10. An adapter for a portable land mobile radio (LMR) transceiver system including an LMR transmitter control system configured to cause a transmitter of said portable LMR transceiver system to temporarily transmit a Radio Frequency (RF) signal during a period of user activation of a push-to-talk (PTT) switch, comprising:

a tip-ring-sleeve (TRS) socket configured to accept a plug from a standard mobile phone headset;

an adapter circuit coupled to said LMR transmitter control system to facilitate operation of said LMR transmitter control system with the standard mobile phone headset that does not include the PTT switch, said adapter circuit configured to detect when a momentary actuation of an answer/end switch of the standard mobile phone headset is occurring, alternately latch a PTT input of said LMR transmitter control system in a transmit active state or a transmit inactive state in response to said detection that the momentary actuation of the answer/end switch is occurring, detect when the plug of the standard mobile phone headset is being removed from the TRS socket, and latch the PTT input of said LMR transmitter control system from said transmit active state to said transmit inactive state in response to the detection that the plug is being removed from the TRS socket.

11. The adapter according to claim 10, wherein said adapter circuit further comprises a memory latch having an output coupled to said PTT input of said LMR transmitter control system, and said adapter circuit is configured to alternate an output of said memory latch between said transmit active state in which said transmitter is caused to transmit, and said transmit inactive state in which said transmitter does not transmit, and said memory latch alternates between said first and second output state in response to each momentary actuation of said answer/end switch.

12. The adapter according to claim 11, wherein said adapter circuit is configured to automatically reset said memory latch to said transmit inactive state under predetermined conditions, in the absence of detecting actuation of said answer/end switch.

13. The adapter according to claim 10, wherein said adapter circuit is configured to couple audio, including alert tones, from said portable LMR transceiver system to said socket for reproduction in an earpiece of said mobile phone headset.

14. The adapter according to claim 10, wherein said adapter circuit is configured to adjust a receiver audio output level of said portable LMR transceiver system to make it compatible with an impedance of the earpiece.

15. The adapter according to claim 10, wherein said adapter circuit is configured to couple audio from said TRS socket, as provided by a microphone in said mobile phone headset, to said portable LMR transceiver system when said answer/end switch is not activated.

16. The adapter according to claim 15, wherein said adapter circuit is further configured to provide amplification and level adjustment of said audio from said microphone.

* * * * *